Nov. 2, 1954  A. LUMSDEN  2,693,047
FISHING LINE TOWING DEVICE
Filed July 15, 1950  2 Sheets-Sheet 1
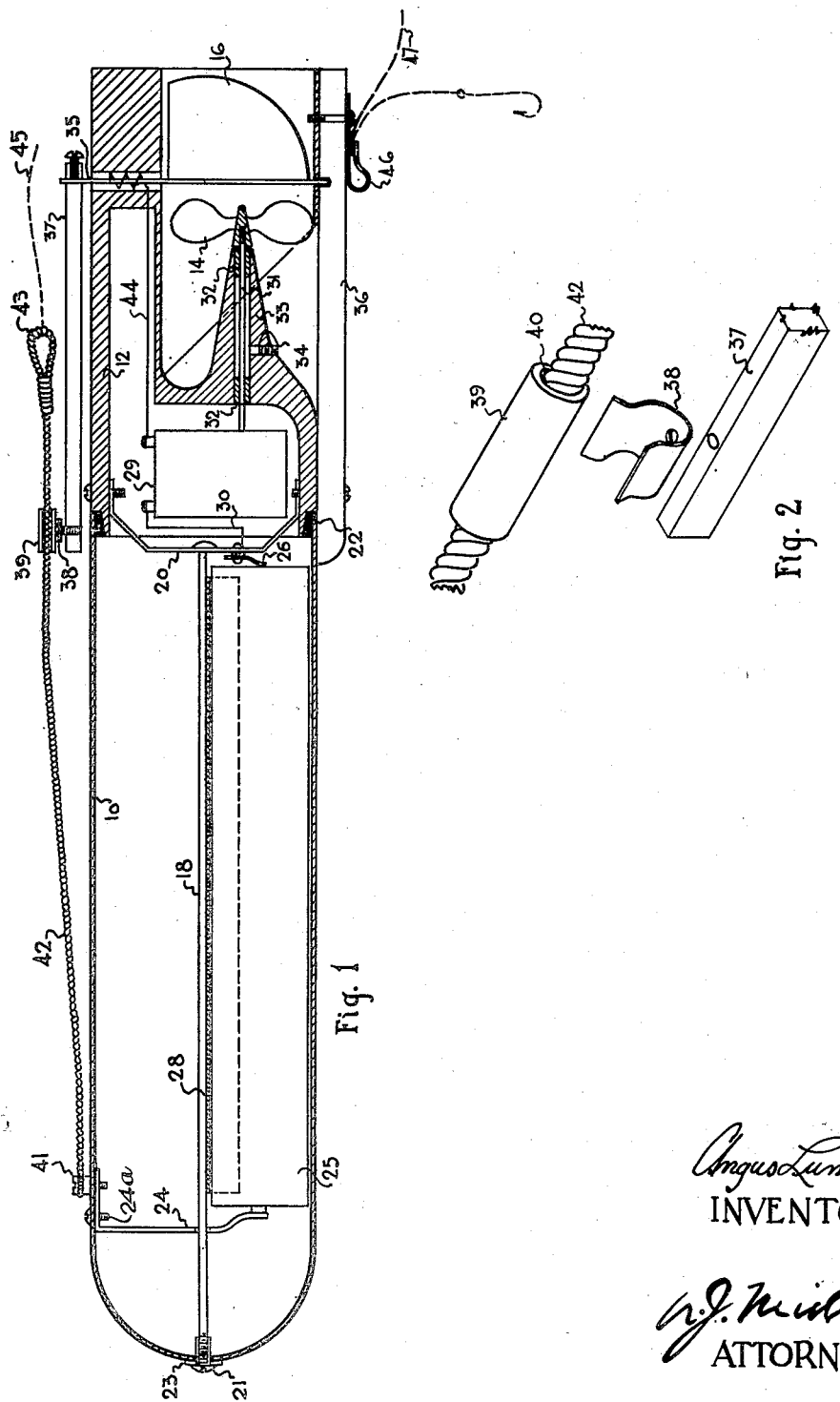
*Angus Lumsden*
INVENTOR
ATTORNEY

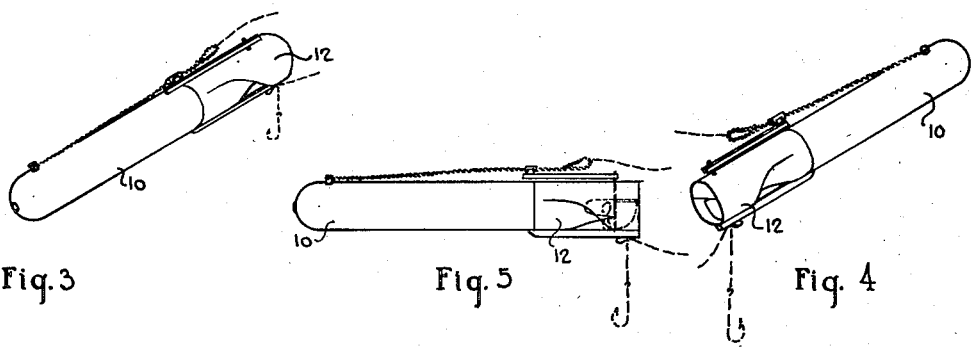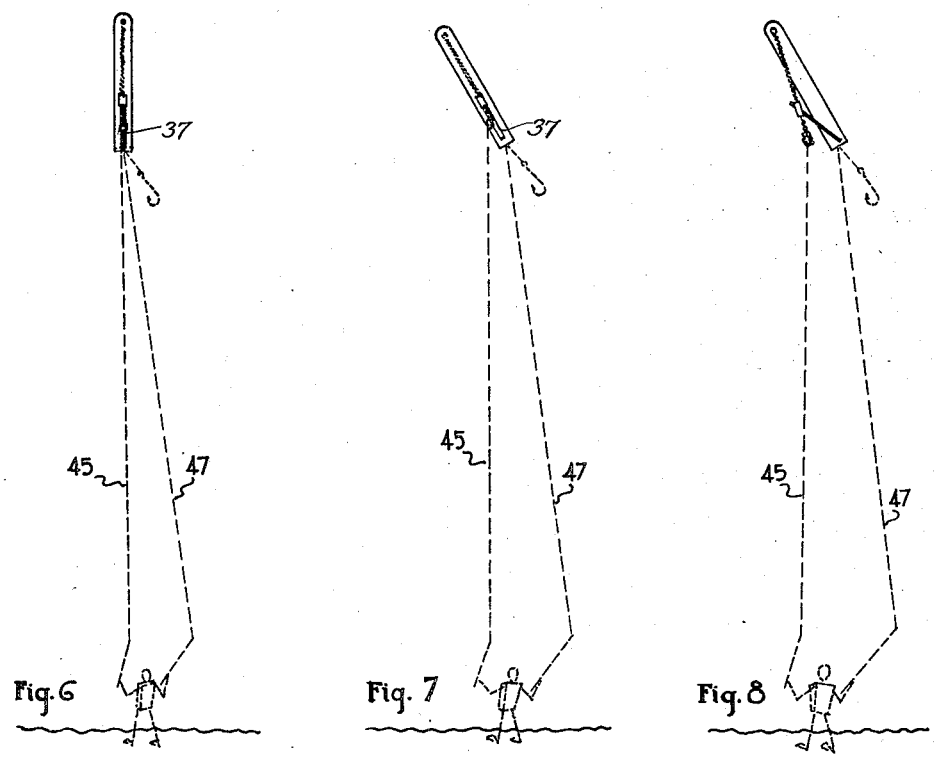

United States Patent Office 2,693,047
Patented Nov. 2, 1954

2,693,047

FISHING LINE TOWING DEVICE

Angus Lumsden, Little Neck, N. Y.

Application July 15, 1950, Serial No. 174,045

5 Claims. (Cl. 43—26.1)

The present invention relates generally to fishing devices and more particularly to devices for towing or placing a baited fishing line a distance from shore.

Various types of devices for towing a baited fishing line away from the shore have been proposed in the past, but such devices have had various defects such as: being too complicated and expensive, not easily controllable by the fisherman, likely to get its propeller tangled up in floating debris and the fishing line, capable of moving for short distances only, incapable of being deenergized once it was released and likely to interfere with the landing of the fish after hooking it. The present invention provides a device wherein the disadvantages of the prior art devices have been overcome, and which at the same time is of simple construction and effective in operation.

Accordingly, one object of the present invention is to provide a novel fishing line towing device which is simple and inexpensive to produce and which is effective and dependable in operation.

Another object is to provide a novel fishing line towing device whose operation may effectively be controlled by a fisherman on shore while the device is removed a considerable distance therefrom.

Another object is to provide a novel fishing line towing device whose direction of travel may effectively be controlled from shore through a single control line.

Still another object is to provide a novel fishing line towing device making it possible to fish from shore with an unsinkered or "live" line, to troll or to fish on the bottom at a considerable distance from shore.

A still further object is to provide a novel towing device which may be deenergized while removed from shore, thereby conserving the propulsive energy stored therein.

A still further object is to provide a novel towing device for a fishing line wherein the fishing line is removed from the device when a fish is hooked or which may be removed from the towing device at the will of the fisherman thereby avoiding interference with the landing of the fish.

The foregoing and other objects and advantages will appear more fully hereinafter from the detailed description which follows taken together with the accompanying drawings wherein one embodiment of the present invention is illustrated by way of example. It is to be expressly understood, however, that the drawings are for the purpose of illustration and description only and are not intended as a definition of the limits of the invention.

In the drawing, wherein like reference characters refer to like parts in the several views, Fig. 1 is a view partly in cross section and partly in elevation of a towing device according to the invention, Fig. 2 is an enlarged, exploded view of the circuit breaker mechanism shown in Fig. 1, Figs. 3 and 4 are rear and front perspective views of the device, respectively, Fig. 5 is a side view and Figs. 6, 7 and 8 illustrate diagrammatically the operation of the novel steering mechanism according to the invention.

Referring now specifically to Fig. 1, the towing device is shown as comprising in general a front or hull section 10 attached to a rear section 12 carrying a propeller 14 and a rudder 16. Sections 10 and 12 are of electrically insulating material, such as a plastic, wood, impregnated fiber, and the like.

The front and rear sections are joined together by means of a through bolt 18 attached to a bracket 20 fastened to the rear section, the bolt passing through a hole located centrally in the nose of the hull section and is secured by means of a nut 21, the tightening of which pulls the two sections together and compresses a gasket 22 located to insure a water tight joint. A rubber washer 23 seals the bolt hole. Located near the nose of the hull section is a flexible contact spring 24 fastened to the hull by means of a pair of screws 24a and adapted to make contact with a terminal contact of the first of a plurality of electric storage cells 25 placed end-to-end within the hull for supplying electric power for propelling the device through the water. A second flexible contact spring 26 is mounted insulatingly on bracket 20 and is adapted to make contact with the base contact of the last storage cell. The cells may be kept in position within the hull by a curved bracket 28 indicated partly in dotted lines securely attached to bolt 18. Contact spring 26 is connected to one terminal of a small electric motor 29 by means of a conductor 30.

Propeller 14 is mounted on a shaft 31 supported by bearings 32 in a hub 33 integral with the rear section 12. Motor 29 is mounted within rear section 12 and is adapted to rotate shaft 31 either directly or through a reduction gearing depending on the speed of the motor, the size of the propeller and the speed at which it is desired to drive the towing device through the water. In order to prevent water from entering the interior of the device through the opening between the shaft and bearings the space between the bearings is filled with grease injected through a threaded opening 34 normally closed by a threaded plug.

The extreme rear end of the rear section forms a semi-cylindrical opening through which water is forced due to rotation of propeller 14. Extending vertically through the opening is a rudder post 35 carrying rudder 16. The rudder post is pivoted in a keel member 36 fastened to the underside of the rear section in order to maintain the device in the water in the position shown in Fig. 1. The rudder post extends a distance above the rear section and is fastened to a tiller 37 which extends in a direction diametrically opposite to that of the rudder. Both the rudder post and the tiller are made of highly electrically conductive material such as copper, brass or aluminum for a reason which will be apparent as the description proceeds. Attached to the free end of the tiller is a clip spring 38 rotatably mounted thereon, for example by a metal bolt threaded into the tiller but leaving a distance between the head of the bolt and the adjacent surface of the tiller somewhat larger than the thickness of the spring. As shown in Fig. 2, the spring 38 is adapted to receive a conductive ring member 39 having an opening 40 therethrough, in such a manner that a pull of a predetermined force on the ring member will cause it to separate from the spring.

Fastened to a binding post 41 mounted near the nose of the hull section 10 and which is in electrical contact with contact spring 24 is a bare, preferably braided, conductive wire 42. The wire passes through the opening 40 in conducting ring 39 and is terminated in a loop or eye 43.

The other terminal of motor 29 is electrically connected to rudder post 35 through a conducting wire 44. In order to prevent straining the wire when the rudder post is rotated, the wire may be loosely wound about the post with several turns before being soldered or otherwise fastened thereto.

The circuit for energizing motor 29 may be traced as follows: From the positive terminal of the front battery of batteries 25 to contact spring 24 and binding post 41, through bare conducting wire 42 to conducting ring 39, clip spring 38 and tiller 37, and from the tiller to the base contact of the batteries through rudder post 35, wire 44, the exciting winding of motor 29, wire 30 and contact spring 26. The motor circuit is closed by pressing conducting ring 39 into clip spring 38, the current passing through the exciting winding of motor 29 from batteries 25 through the circuit traced above. The tension of clip spring 38 is adjusted so that it will maintain ring 39 in contact therewith under normal operation conditions but will permit the ring to be removed therefrom by a pull or jerk on a control line 45 attached to loop 43 of conducting wire 42.

The direction of travel of the device through water is controlled by the single control line 45. As long as the direction of the control line 45 is in line with the direction of travel of the device (see Fig. 6), the tiller will be maintained amidships and hence aid in keeping the device travel in a straight line.

Assume now (see Fig. 7) that for some reason the device while it is headed away from shore veers to the left relative to the fisherman operating the device and standing on shore. The control line 45 will be maintained in a substantially straight line between the bow of the towing device and the fisherman and hence will cause the free end of the tiller 37 to leave its amidship position and move to the left. The conducting ring 39 will slide along conducting wire 42 and the tiller will be positioned as indicated in Fig. 8. This will cause the rudder to move in the opposite direction to steer the device back toward a position wherein the control line 45 is lined up with the length dimension of the device as indicated in Fig. 6. If there is a constant current or wind which will tend to cause the device to drift, the tiller may be offset with respect to the rudder by an amount sufficient to compensate therefor.

If it is desired to cause the towing device to travel in a direction parallel with the fisherman's movement along the shore line, for example to the left as seen from the fisherman, the line is moved to the right along the shore line thus causing the tiller to move to the right and the rudder to the left as above explained thus causing the device to turn toward the left. If now the control line 45 is restrained by the fisherman, the device will point outwardly to the left and hover in area in which it is held until fisherman moves to the left along shore. His leftward motion will somewhat reduce tension on control line and thus permit device to move in a leftward direction. The resistance of the water to the control line which is being pulled sidewise through it by the leftward motion of both the device and the fisherman will tend to put a bight in the control line which will activate the rudder to further steer the device to the left.

The device is illustrated for convenience sake as being substantially cylindrical with a rounded front section but it will be obvious to those skilled in the art that the device may be given various forms or shapes so as to minimize the friction of the water without departing from the scope of this invention. It has been found that three series-connected dry cells will operate a small 6 volt D. C. motor for a considerable period of time, but the length of operation of the device on one set of batteries may be increased by usitng wet cells or by using a bank of batteries in a well known manner.

A spring slip 46 is fastened to the device, for example to the keel 36 as shown for receiving the bight of a fishing line 47 as indicated in Fig. 1. The tension of the clip spring is adjusted so as to prevent the fishing line from becoming removed therefrom by the normal pull on the fishing line, but to permit it to become disengaged when a fish strikes or when the line is subjected to a jerk by the fisherman thereby permitting the fishing line to be removed from the device at the will of the fisherman. This will avoid the interference of the device with the normal landing of the fish. The electrical circuit of the device may be broken at will by the fisherman by jerking on the control line 45 until conducting ring 39 becomes disassociated from clip spring 38 thereby conserving the batteries.

It will be noted that this device is adapted to permit various manners of fishing which heretofore could only be done from a boat. Thus if it is desired to troll, the fishing line is baited and adjusted so that the hook will be removed from the device by a desired distance and the device may be caused to move in various directions relative to the shore. As soon as a fish strikes, the fishing line is automatically removed by the force of the strike itself or it may be removed by a sudden jerk on the fishing line.

The towing device may now be made inoperative by jerking on the control line until the conductive member 39 slips out of clip spring 38 thereby breaking the motor circuit as above pointed out and pulled to shore whenever it is convenient. If it is desired to use the device as a simple float removed from shore, the device may be permitted to pull the fishing line a desired distance and then made inoperative. If it is desired to bottom fish, the device may be used to pull the hook of the fishing line out from the shore and the fishing line may be detached from the towing device whereupon it will sink to the bottom and the device may be deenergized and pulled back to shore. It will be noted by the simple attachment of the fishing line to the towing device there is very little likelihood that the line will become snarled. It will also be noted that the propeller and the rudder are protected against interference from floating debris, while not restricting the flow of water from the propeller. Thus it will be seen that a device has been provided wherein all the objects of the invention have been accomplished and which is a very versatile fishing implement.

If it is desired to use an internal combustion engine, for example, instead of the electrically driven motor of the embodiment illustrated, the ignition circuit thereof may be established and interrupted in the same manner as the motor circuit is interrupted.

Although only one embodiment of the invention has been illustrated and described in detail, it is to be expressly understood that the invention is not limited thereto. Various changes may be made in the design and arrangement of the parts without departing from the spirit and scope of the invention as defined in the appended claims.

What is claimed is:

1. A fishing line towing device comprising in combination, an elongated buoyant hull, a rudder for controlling the direction of movement of said device through water, a rudder post for rotatably mounting said rudder on said hull, a propeller mounted on said hull, means for rotating said propeller mounted within said hull, a control mechanism for said rudder including a rigid arm securely attached to said rudder post and aligned with the longitudinal axis of the hull when the rudder is positioned amidships, a flexible member having one end attached to the hull at a point remote from the free end of the arm but in alignment with the arm when the latter is in amidship position and means at the other end of said flexible member for connection to a control line, means near said other end of said flexible member for securing it to the end of the arm in such a manner as to permit movements of said arm about the axis of the rudder post but permitting the rudder post to be detached from said arm by a sudden pull on said control line, a source of electricity positioned in said hull, and an electrical circuit including said source, said flexible member and said arm for energizing said propeller rotating means, and means associated with said hull for frictionally receiving the bight of a fishing line.

2. A fishing line towing device having an elongated hull comprising a hollow front section, a hollow rear section and means for maintaining said sections together to provide a hollow water tight interior compartment, a source of electricity and a motor mounted within said compartment, a propeller mounted externally of said rear section and adapted to be driven by said motor, a rudder, a conducting rudder post for pivotally mounting said rudder near the rear end of said rear section, means for maintaining the device in the water in such a manner that said rudder post will be substantially vertical, a conductive tiller mounted on said rudder post and extending toward the front end of the device when said rudder is in an amidships position, conducting means attached to the front section of the hull and detachably connected to the forwardly extending end of said tiller and adapted to permit the tiller to swing laterally sufficiently to steer the device through water, means on the towing device for frictionally receiving the bight of a fishing line, and an electrically energized control circuit extending from said motor through said rudder post, said tiller, said conducting means, said source of electricity and back to said motor, said control circuit being adapted to be interrupted to deenergize said motor, and said tiller being adapted to be displaced laterally of the device by means of a single control line extending from an operator at a remote point and attached to said conducting means near the point where the conducting means is detachably connected to the tiller.

3. A fishing line towing device having an elongated hull comprising a front section and a rear section and means for maintaining said sections together, electrical energy storage means having a pair of terminals contained in said front section, a binding post insulatingly attached to said front section near the forward end thereof, means for electrically connecting said binding post to one terminal of said electrical energy storage means, propulsive means including an electrical motor having a pair of terminals and a propeller mounted on said rear section, means for connecting one terminal of the motor to the other terminal of the electrical energy storage means, a rudder, an electric conducting rudder post for pivotally mounting said rudder near the rear end of said rear section, means for electrically connecting said rudder post to the other terminal of said motor, an electric conducting tiller having one end mounted on said rudder post and extending in a direction toward the front of the device when the rudder is positioned for maintaining said device on a straight course, an electrically conducting spring clip mounted on the forward end of said tiller, a conducting ring adapted to be frictionally held by said spring clip, a bare conducting wire having one end attached to said binding post and electrically connected thereto, said conducting wire extending through said conducting ring, means at the other end of said wire for connection to a control line and means on the towing device for frictionally receiving the bight of a fishing line.

4. A towing device for a fishing line comprising an elongated, buoyant body portion having a bow and a stern, rudder means movably mounted on said body portion for controlling the direction of travel of the device through water, a tiller connected at one end thereof to said rudder, a conductive member detachably mounted on the other end of said tiller, a conductive wire fastened to said device near the bow thereof and slidably retained by said conductive member, a control line connected to said conductive wire, a propeller, electrical motor means for driving said propeller and being connected in an electrically energized circuit including a source of electricity, said conductive wire, said conductive member and said tiller, said circuit being interrupted when said conductive member is detached from said tiller and means associated with said body portion for frictionally receiving a detachable fishing line.

5. A fishing line towing device comprising an elongated, buoyant hull having a water-tight compartment therein, a source of electricity having two terminals positioned in said compartment, a rudder, a rudder post for pivotally mounting said rudder on said hull for controlling the direction of travel of the device, a propeller, a propeller shaft carrying said propeller, electrically controllable means for rotating said propeller shaft and connected to one of the terminals of the source of electricity, a tiller attached to said rudder post, said tiller and said rudder post being adapted to conduct an electric current, electrical conducting means connected at one end thereof to the hull at a point in alignment with said tiller when said tiller is in amidships position, said conducting means being connected to the other of the terminals of the source of electricity and normally making electrical and physical contact with the free end of the tiller, means for pivotally mounting said conducting means on the hull, said free end of the tiller being adapted to move laterally when said conducting means is at an angle with respect to the longitudinal axis of the device to move the rudder in such a direction as to tend to steer the device toward a position where the direction of said conducting means is in alignment with the longitudinal axis of the device, said conducting means, the tiller and the rudder post which is electrically connected to said rotating means forming an electrical control circuit between said terminals of the source of electricity, a control line attached to the other end of the conducting means, circuit interrupting means associated with said control line and included in said circuit adapted to open said circuit when said control line is subjected to a sudden pull, and means associated with said hull for frictionally receiving the bight of a fishing line.

References Cited in the file of this patent

UNITED STATES PATENTS

| Number | Name | Date |
| --- | --- | --- |
| 1,818,103 | Sperry | Aug. 11, 1931 |
| 1,850,296 | Vermeulen | Mar. 22, 1932 |
| 2,364,233 | Morey | Dec. 5, 1944 |
| 2,515,511 | Hansen | July 18, 1950 |

FOREIGN PATENTS

| Number | Country | Date |
| --- | --- | --- |
| 268 | Great Britain | 1897 |
| 439,732 | Great Britain | Dec. 12, 1935 |